(12) United States Patent
Lee

(10) Patent No.: US 8,787,701 B2
(45) Date of Patent: *Jul. 22, 2014

(54) IMAGE PROCESSING APPARATUS AND IMAGE PROCESSING METHOD

(71) Applicant: Samsung Electronics Co., Ltd., Gyeonggi-do (KR)

(72) Inventor: Jung-Won Lee, Ansan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/912,941

(22) Filed: Jun. 7, 2013

(65) Prior Publication Data

US 2013/0272628 A1  Oct. 17, 2013

Related U.S. Application Data

(63) Continuation of application No. 12/721,670, filed on Mar. 11, 2010, now Pat. No. 8,478,075.

(30) Foreign Application Priority Data

Sep. 8, 2009  (KR) ........................ 10-2009-0084603

(51) Int. Cl.
*G06K 9/32* (2006.01)
*G09G 5/02* (2006.01)

(52) U.S. Cl.
USPC ........................................... 382/294; 345/592

(58) Field of Classification Search
CPC .................................... G06T 1/00; G06T 3/00
USPC .......... 382/285, 291, 294, 305, 312; 345/204, 345/418, 419, 501, 545, 592, 629, 634, 345/665; 348/584
See application file for complete search history.

(56) References Cited

U.S. PATENT DOCUMENTS 4,515,450 A     5/1985  Arrazola
5,727,192 A  *  3/1998  Baldwin ....................... 345/522
(Continued)

FOREIGN PATENT DOCUMENTS

EP         1 404 130 A1    3/2004
EP         1 662 795 A2    5/2006
WO      2006/030401 A2    3/2006

OTHER PUBLICATIONS

Extended European Search Report, dated Feb. 20, 2014, issued by the European Patent Office in counterpart European Application No. 10157643.7.

*Primary Examiner* — Kanjibhai Patel
(74) *Attorney, Agent, or Firm* — Sughrue Mion, PLLC

(57) ABSTRACT

An image processing apparatus and an image processing method processing a graphic image are provided. An image processing apparatus including: a display unit; a first image output unit which outputs a first image signal; a second image output unit which outputs a second image signal and a transparency information with respect to the second image signal; an image mixing unit which outputs a third image signal mixing the first image signal and the second image signal by using the transparency information; an image processing unit which processes the third image signal to output to the display unit; and a control unit which extracts the transparency information from the second image output unit, and outputs a position information about which the second image signal is displayed in the display unit based on the extracted transparency information to the image processing unit.

19 Claims, 7 Drawing Sheets

(56) References Cited

U.S. PATENT DOCUMENTS

| | | |
|---|---|---|
| 6,195,475 B1 * | 2/2001 | Beausoleil et al. ............ 382/312 |
| 6,226,047 B1 | 5/2001 | Ryu |
| 6,466,224 B1 * | 10/2002 | Nagata et al. ................. 345/592 |
| 6,853,385 B1 * | 2/2005 | MacInnis et al. ............. 345/629 |
| 6,954,905 B2 | 10/2005 | Brown et al. |
| 7,019,757 B2 | 3/2006 | Brown et al. |
| 7,046,254 B2 | 5/2006 | Brown et al. |
| 7,483,042 B1 | 1/2009 | Glen |
| 7,843,511 B2 * | 11/2010 | Kang et al. .................... 348/584 |
| 7,889,205 B1 * | 2/2011 | Parenteau et al. ............. 345/545 |
| 2006/0164437 A1 | 7/2006 | Kuno |
| 2007/0222798 A1 | 9/2007 | Kuno |
| 2008/0168493 A1 | 7/2008 | Allen et al. |
| 2009/0046996 A1 | 2/2009 | Harada |
| 2009/0059074 A1 | 3/2009 | Suematsu et al. |
| 2009/0080802 A1 | 3/2009 | Shuto |

* cited by examiner

IMAGE PROCESSING APPARATUS AND IMAGE PROCESSING METHOD

CROSS-REFERENCE TO RELATED APPLICATION

This is a continuation of application Ser. No. 12/721,670 filed Mar. 11, 2010, which claims priority from Korean Patent Application No. 10-2009-0084603, filed on Sep. 8, 2009, in the Korean Intellectual Property Office, the disclosure of which is incorporated herein by reference.

BACKGROUND OF THE INVENTION

An apparatus and a method consistent with exemplary embodiments relate to an image processing apparatus and an image processing method, and more particularly, to an image processing apparatus and an image processing method for processing a graphic image.

DESCRIPTION OF THE RELATED ART

If a graphic image such as an on screen display (OSD) is overlapped over a video image displayed as a main image, an image processing apparatus performs an alpha-blending with respect to the video image and the graphic image by using an alpha information. The alpha information is a value used in processing the alpha-blending, and means to mix a color of a background, and a color of an image overlapped thereover.

When processing an image, for example, when presuming a movement or converting a frame rate, it is necessary to discern a graphic image and a video image to reduce an error due to an image mixture.

If a graphic image and a video image is discerned with a method of regarding or presuming a specific area as a graphic video, a clear grasp with respect to an overlapped area is impossible, thereby causing an error in an image processing, and deteriorating an image quality.

SUMMARY OF THE INVENTION

Illustrative, non-limiting embodiments overcome the above disadvantages and other disadvantages not described above. Also, the present invention is not required to overcome the disadvantages described above, and an illustrative, non-limiting embodiment of the present invention may not overcome any of the problems described above.

Accordingly, it is an aspect of the exemplary embodiments to provide an image processing apparatus and an image processing method processing an image based on a correct position information of a graphic image.

Another aspect of the exemplary embodiments is to provide an image processing apparatus and an image processing method determining a position information of a graphic image based on a transparency information.

Still another aspect of the exemplary embodiments is to provide an image processing apparatus and an image processing method processing an image based on a transparency information.

According to an aspect of the exemplary embodiments, there is provided an image processing apparatus including: a display unit; a first image output unit which may output a first image signal; a second image output unit which may output a second image signal and a transparency information with respect to the second image signal; an image mixing unit which may output a third image signal mixing the first image signal and the second image signal by using the transparency information; an image processing unit which may process the third image signal to output to the display unit; and a control unit which may extract the transparency information from the second image output unit, and may output a position information about which the second image signal is displayed in the display unit based on the extracted transparency information to the image processing unit.

The control unit may output to the image processing unit a transparency map representing whether there exists the transparency information with respect to each pixel.

The control unit may compare the transparency information with a predetermined reference value, and may output to the image processing unit a transparency map with respect to the position of the second image signal generated based on a comparison result.

The control unit may classify the transparency information into a predetermined group depending on a transparency degree, and may output to the image processing unit a transparency map with respect to the position of the second image signal based on a classification result.

The image processing apparatus may further comprise a user interface for determining the reference value.

The image processing unit may comprise a frame rate converting unit which converts a frame rate of the third image signal.

If the third image signal is a two dimensional image, the image processing unit may include an image converting unit which converts the two dimensional image into a three dimensional image signal.

The first image signal may include a video image, and the second image signal may include a graphic image.

The image processing apparatus may further include a broadcasting receiving unit which receives a broadcasting signal, wherein the first image signal may include a broadcasting image signal included in the broadcasting signal, and the second image signal may include a data signal included in the broadcasting signal.

According to another aspect of the exemplary embodiments, there is provided a control method of an image processing apparatus, including: receiving a first image signal, a second image signal and a transparency information with respect to the second image signal; mixing the first image signal and the second image signal by using the transparency information; generating a position information by which the second image signal is displayed in a display unit based on the transparency information; and processing the mixed image signal by using the position information.

The generating the position information may include generating a transparency map representing whether there exists the transparency information with respect to each pixel.

The generating the position information may include comparing the transparency information with a predetermined reference value, and generating a transparency map with respect to the position of the second image signal generated based on a comparison result.

The generating the position information may include classifying the transparency information into a predetermined group depending on a transparency degree, and generating a transparency map with respect to the position of the second image signal based on a classification result.

The processing the mixed image signal may include converting a frame rate of the mixed image signal.

The first image signal may include a video image, and the second image signal comprises a graphic image.

BRIEF DESCRIPTION OF THE DRAWINGS

The aspects of the exemplary embodiments will become apparent and more readily appreciated from the following description of the exemplary embodiments, taken in conjunction with the accompanying drawings, in which:

FIG. 3 illustrates a transparency map by a control unit in FIG. 1;

FIG. 4 illustrates another transparency map by the control unit in FIG. 1;

DETAILED DESCRIPTION OF EXEMPLARY EMBODIMENTS

Figure 1:
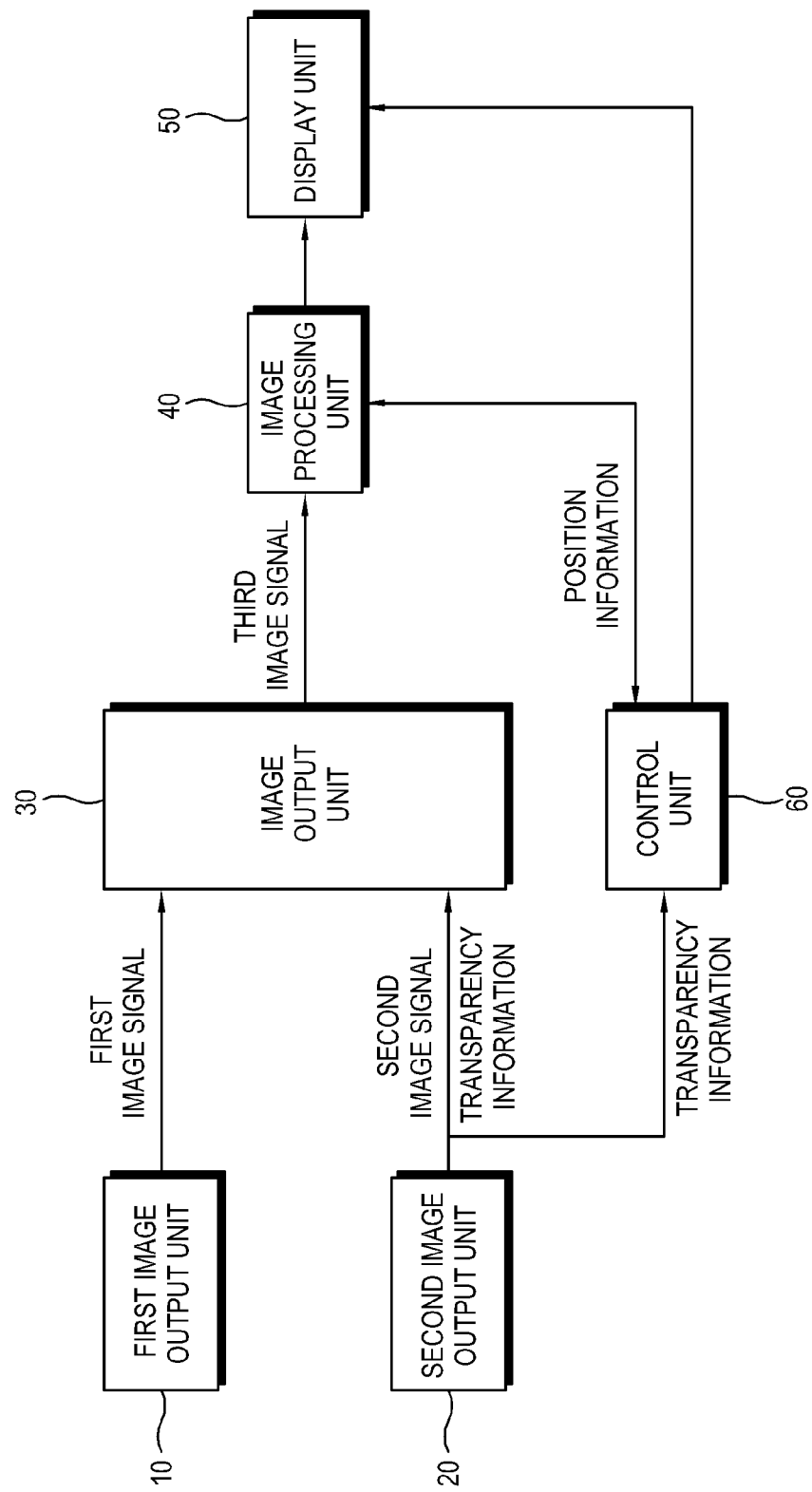
FIG. 1 is a control block diagram of an image processing apparatus according to an exemplary embodiment.

Reference will now be made in detail to exemplary embodiments, examples of which are illustrated in the accompanying drawings, wherein like reference numerals refer to like elements throughout. The exemplary embodiments are described below so as to explain the present invention by referring to the figures. The present invention may, however, be embodied in many different forms and should not be construed as being limited to the embodiments set forth therein; rather, these embodiments are provided so that this disclosure will be thorough and complete, and will fully convey the concept of the present invention to those skilled in the art. Repetitive description with respect to like elements of different embodiments may be omitted for the convenience of clarity.

Figure 2:
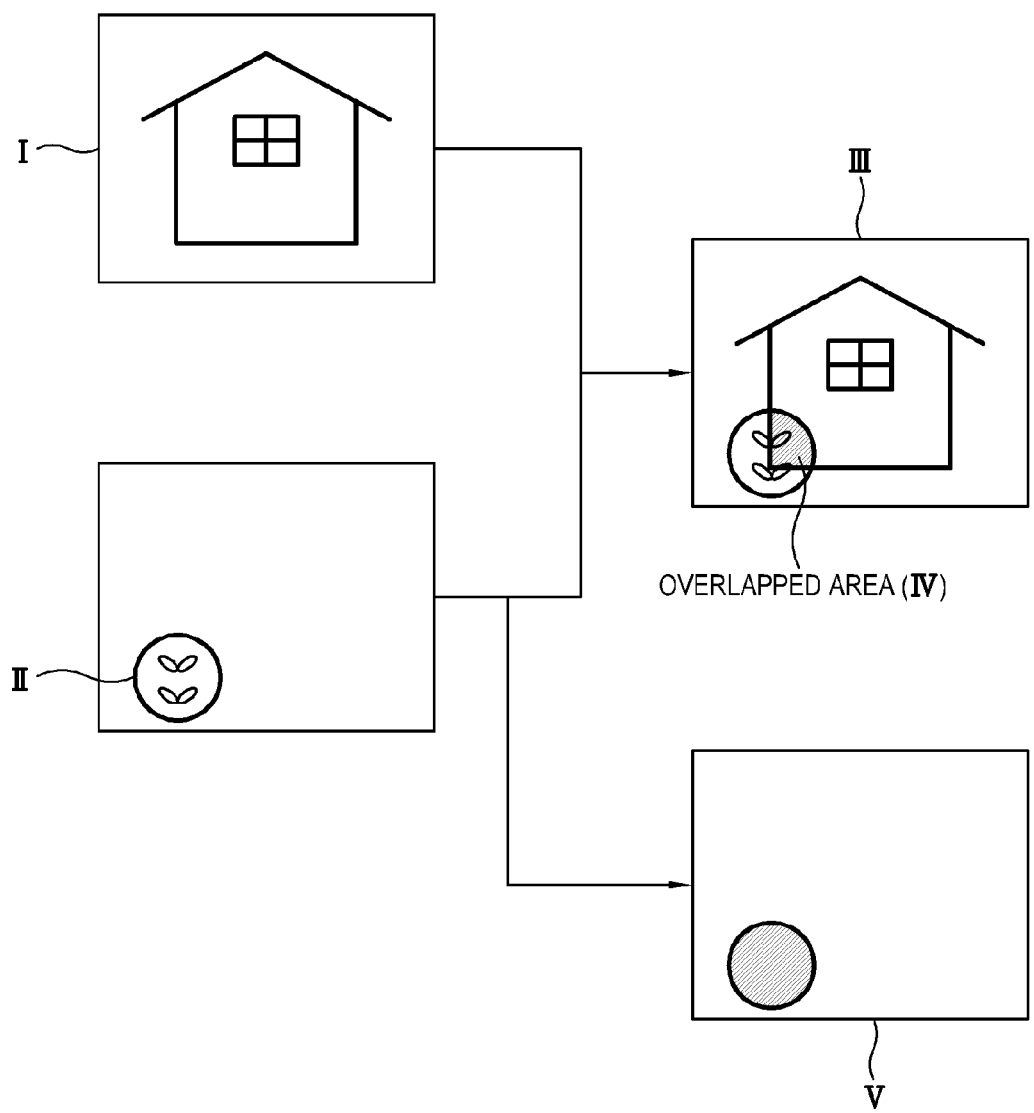
FIG. 2 illustrates an image according to each stage of the image processing apparatus in FIG. 1.

FIG. 1 is a control block diagram of an image processing apparatus according to an exemplary embodiment, and FIG. 2 illustrates an image output from each configuration block of the image processing apparatus in FIG. 1. As shown therein, the image processing apparatus includes a plurality of image output units 10 and 20, an image mixing unit 30 mixing an image output from the plurality of image output units 10 and 20, an image processing unit 40 processing a mixed image, a display unit 50, and a control unit 60 controlling, at least, the image processing unit 40 and the display unit 50. The image processing apparatus according to the exemplary embodiment includes a display apparatus capable of processing a plurality of images in different layers, and may include a computer system, a television, various terminals, etc.

The first image output unit 10 outputs a first image signal, and the second image output unit 20 outputs a second image signal. The first image signal and the second image signal are formed in different layers, mixed, and then displayed in the display unit 50. The first image signal may be an image signal formed in a subordinate layer displaying a video image, that is a video layer, and the second video signal may be a graphic image included in a graphic layer such as an on screen display (OSD), sub picture, a caption, etc. overlapped over the video layer.

The first image output unit 10 and the second image output unit 20 may include an image source outputting an image to the image mixing unit 30. For example, the first image output unit 10 and the second image output unit 20 may include a broadcasting receiving unit outputting a broadcasting image, a network interface such as an internet, a connecting unit receiving a digital versatile disk (DVD) image, a game module outputting a game image, a user interface (UI) generating unit generating a graphic user interface such as an OSD, etc. The first image output unit 10 and the second image output unit 20 may have a physically independent configuration, or may be provided as a single configuration as long as it is a configuration capable of outputting different images overlapped to be displayed.

If the second image signal output from the second image output unit 20 is a graphic image overlapped over a video image, the second image output unit 20 further outputs to the image mixing unit 30 a transparency information representing a transparency degree. This transparency information is referred to an alpha value, and corresponds to a fourth color element corresponding to an opacity degree of the second image signal although not shown. Typically, the alpha value is a 8-bit data capable of discerning a transparency degree of 0 to 255.

The image mixing unit 30 performs an alpha blending mixing an image based on the first image signal, the second image signal, and the transparency information. Hereinafter, an image signal mixed in the image mixing unit 30 and output to the image processing unit 40 will be referred to a third image signal. As shown in FIG. 2, if a first image signal I in which a house is illustrated, and a second image signal II with respect to a leaf included in a circle are input to the image mixing unit 30, a third image signal III in which the house and the leaf are overlapped is output from the image mixing unit 30. In an overlapped area IV in which the first image signal I and the second image signal II are overlapped, a degree by which the first image signal I is displayed varies depending on the transparency information. For example, the house becomes to be displayed more clearly as the transparency increases, and clarity of the house becomes deteriorated and the second image signal II becomes to be displayed more clearly as the transparency decreases. The overlapped area IV in which an object of the first image signal I and the second image signal II are overlapped each other, and a boundary part of the second image signal II overlapped with the first image signal I correspond to an area in which an error is likely to frequently happen in an image processing of estimating a movement or forming an interpolation image. To prevent this error, a position information about where the second image signal is displayed becomes very important in an image processing after mixing. A method by which the image mixing unit 30 mixes an image includes known algorithms, and is not defined in a specific method.

The image processing unit 40 corresponds to a post-processing block processing the third image signal to be finally displayed in the display unit 50. For example, the image processing unit 40 may estimate a movement of the third image signal to interpolate an image, or may include a frame rate converting unit converting a frame rate. Also, if the third image signal is a two dimensional image, the image processing unit 40 may include an image converting unit converting this into a three dimensional image.

The display unit 50 displays an image signal processed in the image processing unit 40. The display unit 50 may include a liquid crystal display (LCD) panel including a liquid crystal, an organic light emitting diode (OLED) panel including an organic light emitting element, or a plasma display panel (PDP), and a panel driving unit driving the panel.

The control unit 60 extracts the transparency information from the second image output unit 20, and outputs a position information V (see FIG. 2) to the image processing unit 40 based on the extracted transparency information. The illustrated position information means information about a pixel in which the second image signal II is displayed in the display unit 40. As described above, if the second image signal II is overlapped over the first image signal I, it is necessary for the image processing unit 40 to correctly determine the position with respect to the second image signal II. Also, since an image processing may vary depending on the transparency degree, to determine a correct transparency information may be an important factor for the movement estimation and the image interpolation.

Conventionally, since the position of the second image signal is determined by expecting the position or the shape in which the second image signal is likely to exist, or by presuming a still image, an error happening rate is high in a movement estimation and interpolating a frame. Especially, if the first image signal is a motion picture, or if the second image signal is not a typical shape, it is difficult to determine the position and it leads to an image processing error.

The control unit 60 according to the present exemplary embodiment supplies a correct position information of the second image signal II to the image processing unit 40 by using the transparency information. The control unit 60 may supply all of the transparency information to the image processing unit 40, or may supply a part of the transparency information, or may supply only information about a position but the transparency information. In any case, the control unit 60 supplies information about an area in which the second image signal II does not exist, and information about an area in which the second image signal II exists in a map type so that the image processing unit 40 can easily determine the position of the second image signal II.

Figure 3:
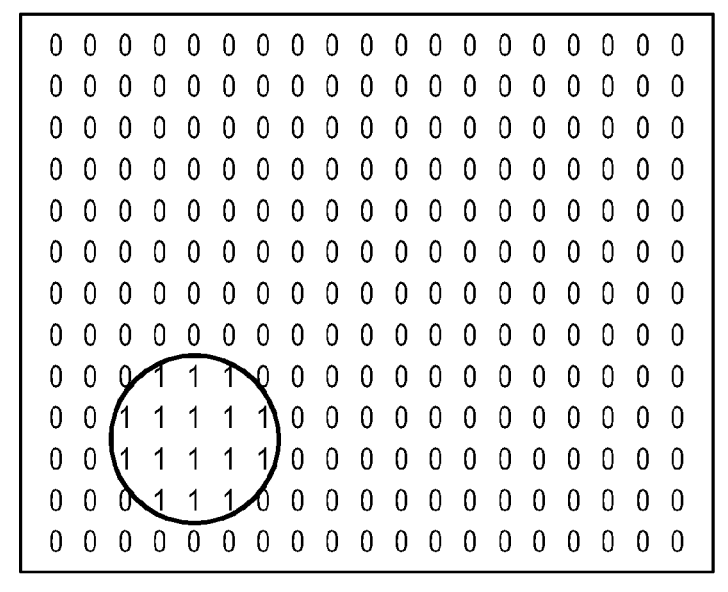
Figure 4:
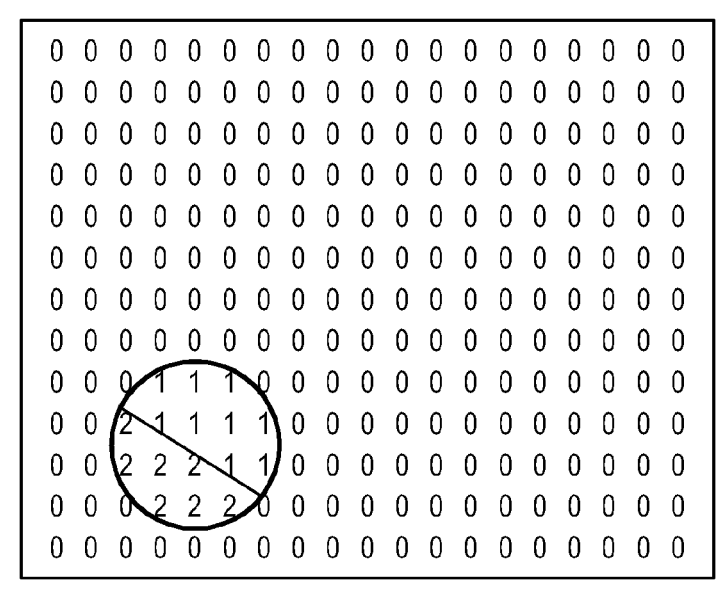

FIGS. 3 and 4 illustrate a transparency map by the control unit 60. FIG. 3 illustrates a transparency map representing whether there exists the transparency information by each pixel. The control unit 60 may generate information that "1" is referred to an area in which there is the transparency information, that is, an area in which the second image signal II is overlapped with the first image signal I, and "0" is referred to an area in which there is only the first image signal I by each pixel to output to the image processing unit 40. In this case, since the amount of data of the position information output to the image processing unit 40 becomes reduced in comparison to the case that the transparency information itself is output, a data processing speed increases.

According to another exemplary embodiment, the control unit 60 may compare the transparency information with a predetermined reference value, and may generate a transparency map based on a comparison result. For example, if the transparency is very high so that an image is displayed like there is no second image signal II, although there is transparency information, the control unit 60 may output "0" although there is the second image signal II. In this case, the control unit 60 may further include a comparing unit comparing the transparency information with a reference value. This reference value may be determined to be various levels, and it is possible to selectively omit to apply the reference value.

FIG. 4 illustrates a transparency map in the case that the reference value exists in plural. It may be applied to the case that the transparency information about the second image signal II has not a single value but a partially different value, and the case that the second image signal II having a different transparency information exists not continuously but intermittently. For example, a transparency degree of a part of the second image signal II may be 70%, and that of the remained part thereof may be 20%. In this case, the image processing unit 40 may process an image by using different algorithms or variables depending on the transparency degree. With a consideration of this point, the control unit 60 may add the position information of the second image signal II to supply the transparency information to the image processing unit 40. The control unit 60 may classify the transparency information into a predetermined group depending on the transparency degree, and may generate a transparency map with respect to the position of the second image signal II based on a classified result. As shown therein, "0" may be output as the position information with respect to an area in which there is only the first image signal I, and a group in which the transparent information of the second image signal II is less than a first reference value. "1" may be output as the position information with respect to a group in which the transparent information of the second image signal II exists between the first reference value and a second reference value which is bigger than the first reference value. "2" may be output as the position information with respect to a group in which the transparent information of the second image signal II is more than the second reference value. The number of the group and the number of the reference value are not fixed, and may be determined with a consideration of a processing ability of the image processing unit 40 and a data processing speed of the comparing unit.

The number used in the above transparency map is just a number referred to for a convenient description, and a data value or a data type which the control unit 60 actually outputs is not defined thereto. Also, the present invention may be applied to the case that overlapped images may be more than two.

Figure 5:
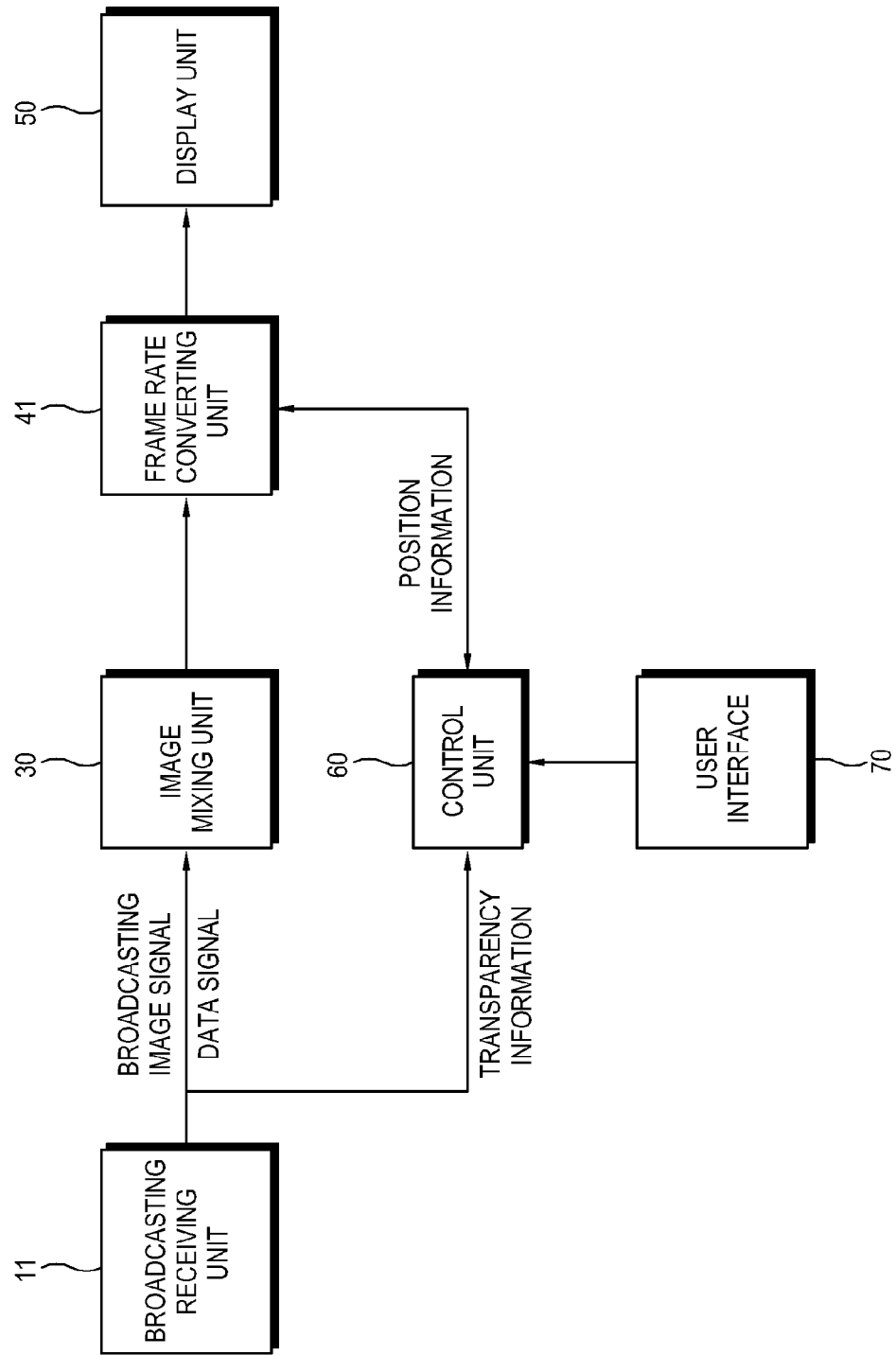
FIG. 5 is a control block diagram of an image processing apparatus according to another exemplary embodiment of the present invention.

FIG. 5 is a control block diagram of an image processing apparatus according to another exemplary embodiment. As shown therein, the image processing apparatus may include a television, a set top box, etc. including a broadcasting receiving unit 11, and includes a frame rate converting unit 41 converting a frame rate of a broadcasting signal, and a user interface 70 for determining a reference value. Repetitive description with respect to the above configurations is omitted.

The broadcasting receiving unit 11 may include an antenna, a tuner, etc. receiving a broadcasting signal. A received broadcasting signal may include a broadcasting image signal corresponding to a broadcasting content, and a data signal corresponding to a data broadcasting. In this case, the broadcasting image signal corresponds to the first image signal according to the above exemplary embodiment, and the data signal corresponds to the second image signal. The broadcasting receiving unit 11 may further include a demultiplexer dividing a broadcasting image signal and a data signal from a broadcasting signal.

Figure 6:
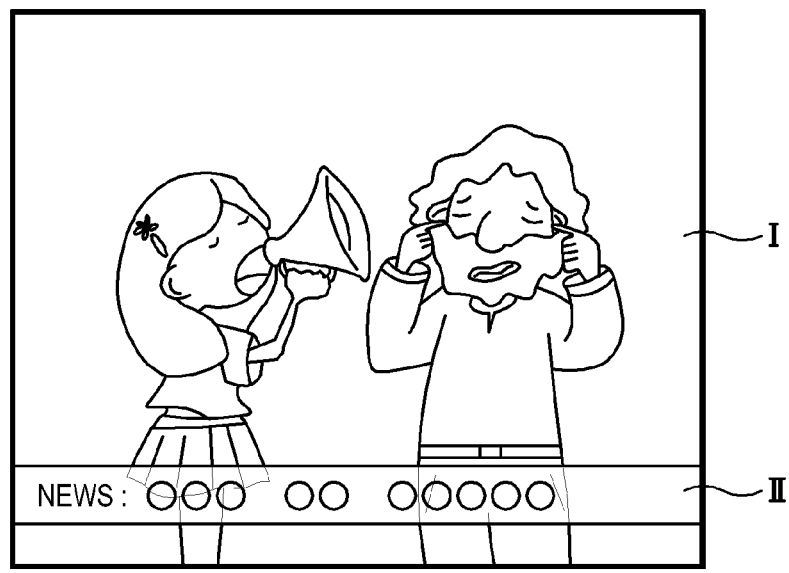
FIG. 6 illustrates a display image according to the image processing apparatus in FIG. 5.

FIG. 6 illustrates a display image displayed in the display unit 50. A second image signal II which is a data signal is overlapped over a first image signal I. In case of the data broadcasting, information related to a broadcasting content, weather, news, a traffic information, etc. are overlapped over a broadcasting signal and to be displayed in a caption type.

The frame rate converting unit 41 corresponds to the image processing unit of the exemplary embodiment described above, and the display unit 50 may include a liquid crystal panel.

The user interface 70 is a configuration for determining a reference value used to a position information which the control unit 60 supplies to the frame rate converting unit 41. The user interface 70 may include a user input unit for a user input, a GUI (graphic user interface) unit generating and displaying a GUI, etc. The reference value may be determined to be a constant value during a manufacturing process of an image processing apparatus, and may be changed or deleted by a user after the manufacturing process.

Figure 7:
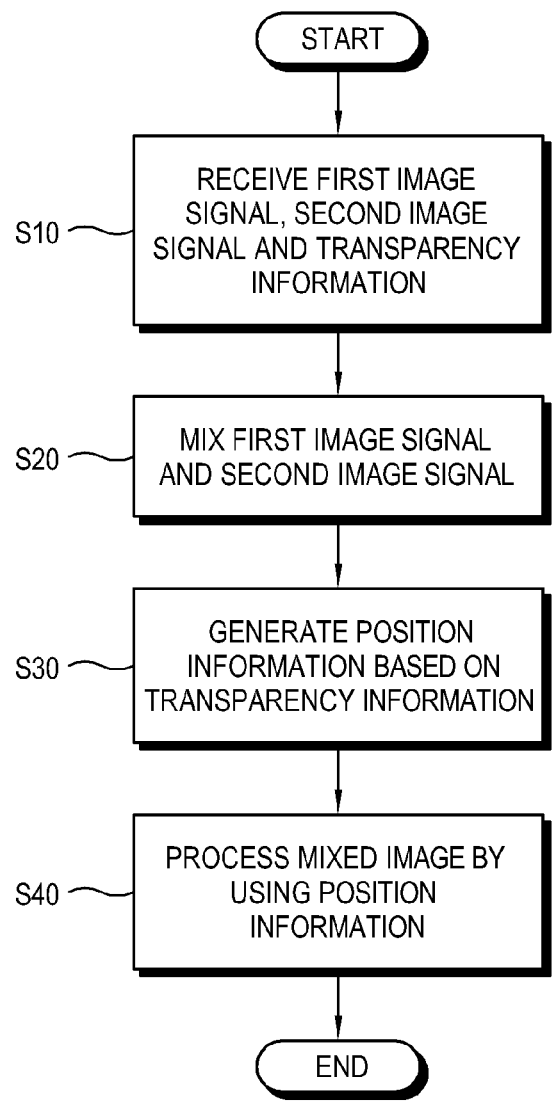
FIG. 7 is a control flowchart for describing a control method of an image processing apparatus according to an exemplary embodiment.

FIG. 7 is a control flowchart for describing a control method of an image processing apparatus according to an exemplary embodiment. A control method of an image processing apparatus according to the present exemplary embodiment will be described by referring to FIG. 7.

At first, the image mixing unit 30 receives a first image signal, a second image signal and a transparency information with respect to the second image signal (S10), and mixes the first image signal and the second image signal by using the transparency information (S20).

The control unit 60 extracts the transparency information from the second image output unit 20, and generates a position information by which the second image signal is displayed in the display unit 50 based on the transparency information (S30). The position information may include a transparency map representing whether there is the transparency information with respect to each pixel, a transparency map based on a transparency information compared a reference value, a transparency map based on a transparency information classified into a group depending on a transparency degree, etc. Also, all or a part of the transparency information may be output to the image processing unit 40 as the position information.

The image processing unit 40 processes an image signal by using the mixed third image signal III and the position information (S40), and displays this in the display unit 50.

As described above, if at least two image layers are overlapped, exemplary embodiments supplied correct position information and transparency information with respect to the overlapped image signal.

As described above, exemplary embodiments provide an image processing apparatus and an image processing method capable of processing an image based on a correct position information of a graphic image.

Also, exemplary embodiments provide an image processing apparatus and an image processing method capable of determining a position information of a graphic image based on a transparency information.

Also, exemplary embodiments provide an image processing apparatus and an image processing method capable of processing an image based on a transparency information.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. An image processing apparatus comprising:
   an image mixing unit which receives a first image signal and a second image signal, mixes the first image signal and the second image signal, and outputs a third image signal as a result of the mixing;
   a control unit which outputs a position information of the second image signal with respect to the first image signal; and
   an image processing unit which processes the third image signal based on the position information such that a region of the third image signal corresponding to the second image is processed differently from other regions of the third image signal and outputs the processed third image signal to a display unit.

2. The image processing apparatus according to claim 1, further comprising:
   a first image output unit which outputs the first image signal; and
   a second image output unit which outputs the second image signal and transparency information with respect to the second image signal,
   wherein the image mixing unit mixes the first image signal and the second image signal by using the transparency information.

3. The image processing apparatus according to claim 2, wherein the control unit extracts the transparency information from the second image output unit and generates the position information of the second image signal based on the extracted transparency information.

4. The image processing apparatus according to claim 3, wherein the control unit outputs the position information including a transparency map representing presence of transparency information with respect to each pixel of the second image signal to be displayed.

5. The image processing apparatus according to claim 3, wherein the control unit compares the transparency information with a predetermined reference value, and outputs the position information including a transparency map with respect to the position of the second image signal, the transparency map generated based on a result of the comparison.

6. The image processing apparatus according to claim 5, further comprising:
   a user interface for determining the reference value.

7. The image processing apparatus according to claim 3, wherein the control unit classifies the transparency information into a predetermined group depending on a transparency degree, and outputs the position information including a transparency map with respect to the position of the second image signal, the transparency map generated based on a result of the classification.

8. The image processing apparatus according to claim 1, wherein the image processing unit comprises a frame rate converting unit which converts a frame rate of the third image signal.

9. The image processing apparatus according to claim 1, wherein the image processing unit comprises an image converting unit which converts a two dimensional image into a three dimensional image signal,
   wherein if the third image signal is a two dimensional image, the image converting unit converts the two dimensional image into a three dimensional image signal.

10. The image processing apparatus according to claim 1, wherein the first image signal comprises a video image, and the second image signal comprises a graphic image.

11. The image processing apparatus according to claim 1, further comprising:
    a broadcasting receiving unit which receives a broadcasting signal,
    wherein the first image signal comprises a broadcasting image signal included in the broadcasting signal, and the second image signal comprises a data signal included in the broadcasting signal.

12. A control method of an image processing apparatus, comprising:
    receiving a first image signal and a second image signal;
    mixing the first image signal and the second image signal;
    generating a mixed image signal as a result of the mixing;
    generating position information of the second image signal with respect to the first image signal; and
    processing the mixed image signal by using the position information such that a region of the mixed image signal corresponding to the second image is processed differently from other regions of the mixed image signal, and outputting the processed mixed image signal to a display unit.

13. The control method of the image processing apparatus according to claim 12, further comprising:
receiving transparency information with respect to the second image signal.

14. The control method of the image processing apparatus according to claim 13, wherein the generating position information comprises generating the position information including a transparency map representing presence of the transparency information with respect to each pixel of the second image signal to be displayed.

15. The control method of the image processing apparatus according to claim 13, wherein the generating position information comprises comparing the transparency information with a predetermined reference value, and generating the position information including a transparency map with respect to the position of the second image signal, the transparency map generated based on a result of the comparison.

16. The control method of the image processing apparatus according to claim 13, wherein the generating position information comprises classifying the transparency information into a predetermined group depending on a transparency degree, and generating the position information including a transparency map with respect to the position of the second image signal, the transparency map generated based on a result of the classification.

17. The control method of the image processing apparatus according to claim 12, wherein the processing the mixed image signal comprises converting a frame rate of the mixed image signal.

18. The control method of the image processing apparatus according to claim 12, wherein the first image signal comprises a video image, and the second image signal comprises a graphic image.

19. The control method of the image processing apparatus according to claim 12, wherein the first image signal and the second image signal are received from a broadcasting signal, the first image signal comprises a broadcasting image signal included in the broadcasting signal, and the second image signal comprises a data signal included in the broadcasting signal.

* * * * *